Aug. 21, 1951   C. L. COOK   2,564,879
POTATO PLANTER WITH ROTATING DISPENSING MEMBER
HAVING SEED SELECTING MEANS THEREON
Original Filed Feb. 10, 1941   6 Sheets-Sheet 1

INVENTOR:
CURTISS L. COOK
BY
ATTORNEYS.

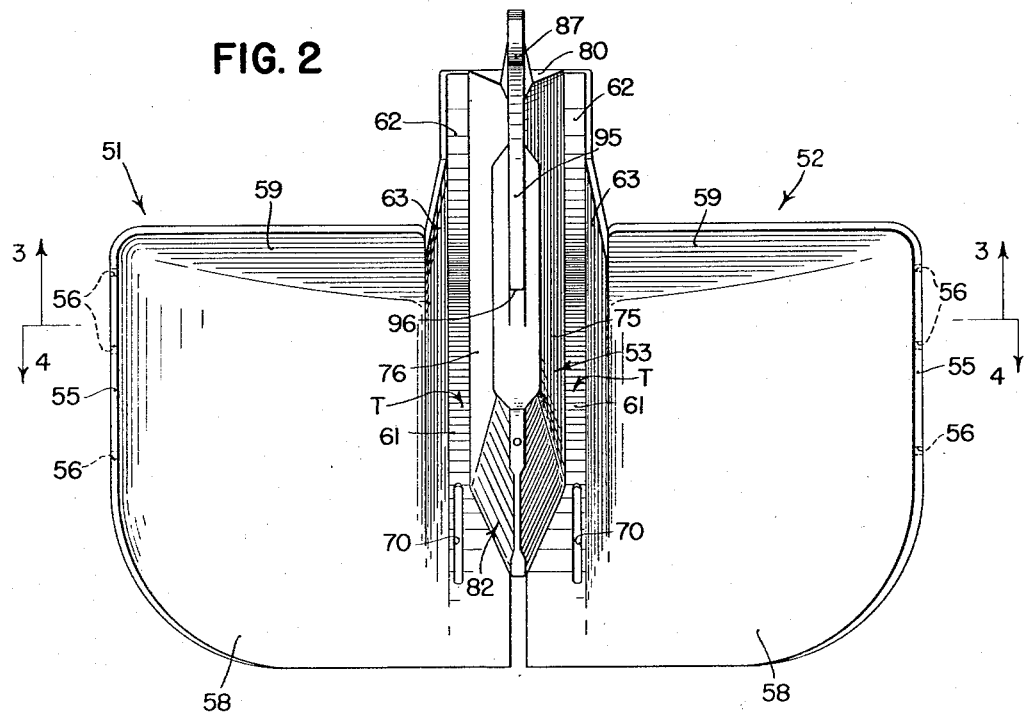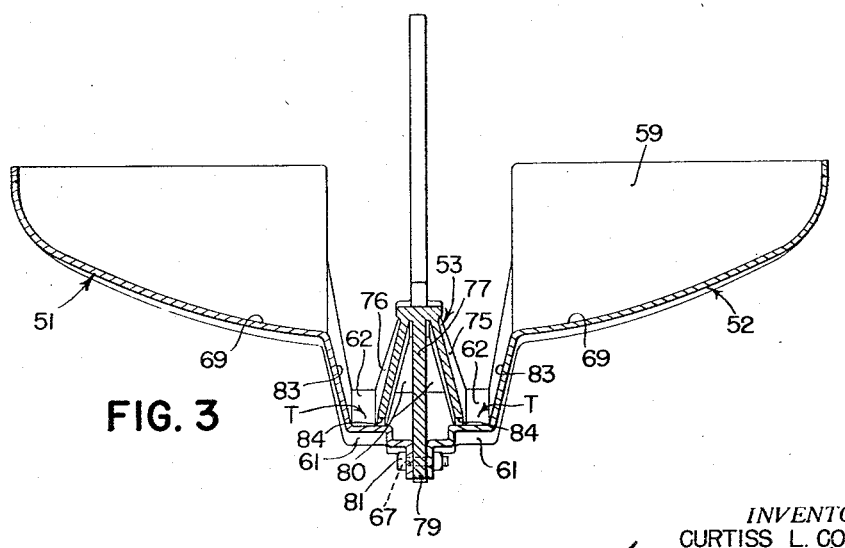

Aug. 21, 1951   C. L. COOK   2,564,879
POTATO PLANTER WITH ROTATING DISPENSING MEMBER
HAVING SEED SELECTING MEANS THEREON
Original Filed Feb. 10, 1941   6 Sheets-Sheet 3
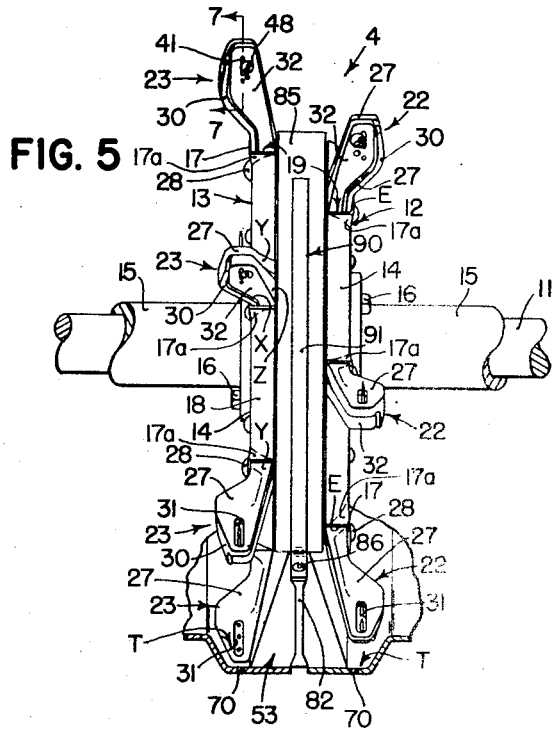
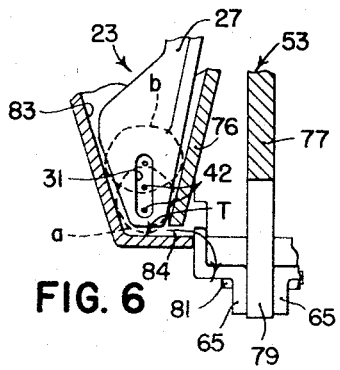
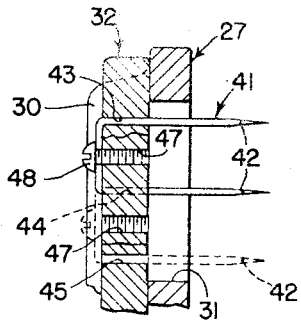
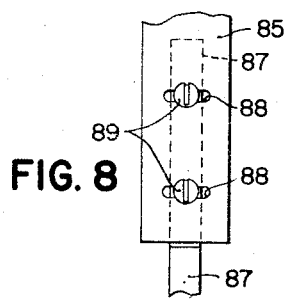
INVENTOR:
CURTISS L. COOK
BY
ATTORNEYS.

Aug. 21, 1951     C. L. COOK     2,564,879
POTATO PLANTER WITH ROTATING DISPENSING MEMBER
HAVING SEED SELECTING MEANS THEREON
Original Filed Feb. 10, 1941     6 Sheets-Sheet 4
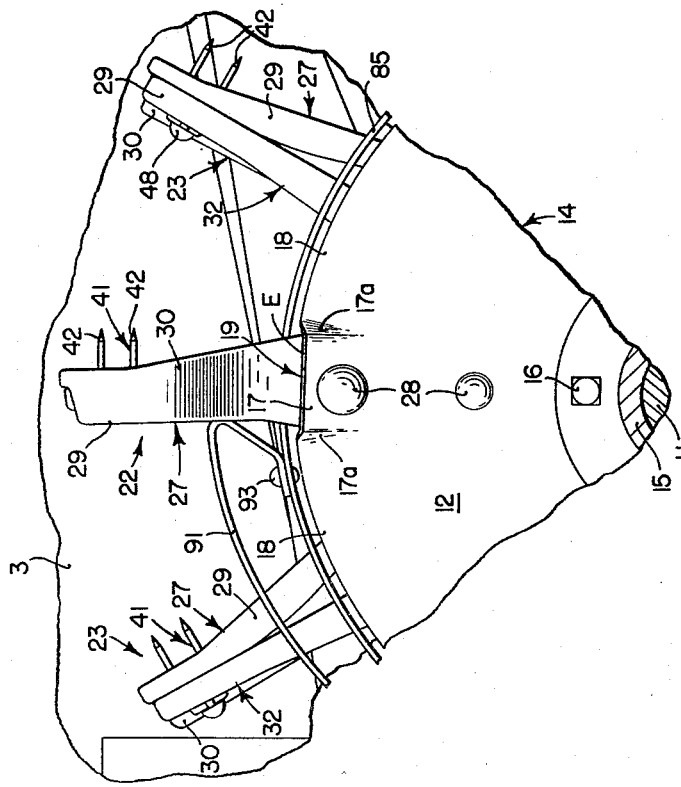
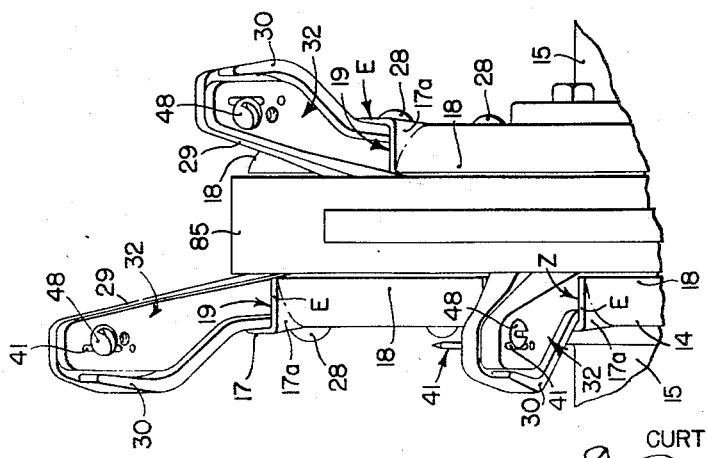
INVENTOR
CURTISS L. COOK
BY
ATTORNEYS Aug. 21, 1951 C. L. COOK 2,564,879
POTATO PLANTER WITH ROTATING DISPENSING MEMBER
HAVING SEED SELECTING MEANS THEREON
Original Filed Feb. 10, 1941 6 Sheets-Sheet 5

INVENTOR
CURTISS L. COOK
BY
ATTORNEYS

Aug. 21, 1951             C. L. COOK             2,564,879
POTATO PLANTER WITH ROTATING DISPENSING MEMBER
HAVING SEED SELECTING MEANS THEREON
Original Filed Feb. 10, 1941             6 Sheets-Sheet 6

INVENTOR
CURTISS L. COOK
BY
ATTORNEYS

Patented Aug. 21, 1951

2,564,879

UNITED STATES PATENT OFFICE 2,564,879

POTATO PLANTER WITH ROTATING DISPENSING MEMBER HAVING SEED SELECTING MEANS THEREON

Curtiss L. Cook, Syracuse, N. Y., assignor to Syracuse Chilled Plow Company, Inc., Syracuse, N. Y., a corporation of New York Continuation of application Serial No. 378,123, February 10, 1941. This application September 1, 1945, Serial No. 613,972

18 Claims. (Cl. 222—13)

This application is a continuation of my copending application, Serial No. 378,123, filed February 10, 1941, for Potato Planters, now abandoned.

The present invention relates generally to agricultural implements and more particularly to potato planters.

The object and general nature of the present invention is the provision of new and improved seed selecting mechanism whereby greater accuracy of planting is secured and also planting at higher speeds is made possible. Another important feature of this invention is the provision of seed selecting mechanism of the picker point type in which a simple radial adjustment of the picker points adapts the machine for different sizes of potato seed. More specifically, it is a feature of this invention to provide a hopper having a generally V-shaped groove, with radial picker arms having points disposed in a plane generally bisecting the angle of the groove and adjustable in the bisecting plane toward or away from the tip of the picker arm, whereby, by virtue of the V-shaped formation of the groove, various sizes of seed may be handled efficiently and accurately. It is also a feature of this invention to provide a new staple point type picking means which is more gentle in action and will take care of a greater variation in seed sizes than previous planters.

It is a further feature of this invention to provide an improved potato planter in which the picker arms are arranged in two axially spaced apart sets arranged with the picker arms in staggered or alternating arrangement, whereby an increase in planting speed is made possible, while, in addition, providing for a greater amount of available time to permit the seed pieces to assume the proper position relative to the picker units. Specifically, it is a feature of this invention to provide a pair of axially spaced apart rotatable picker arm units with a pair of correspondingly spaced apart V-shaped troughs or indentations in the hopper bottom wall so that each picker arm unit operates more or less independently of the other, yet the available planting speed of the machine as a whole is that corresponding to the total number of picker arms in the two units.

Still further, another feature of this invention is the provision of an improved hopper bottom wall construction in which two hopper wall sections and a central inverted V-shaped section are adapted to be secured together to form the two picker arm troughs. Still further, another feature of this invention is the provision of cam means on the central hopper bottom section for controlling the operation of both sets of picker arm units.

These and other objects and advantages of the present invention will be apparent to those skilled in the art after a consideration of the following detailed description of the preferred embodiment, taken in conjunction with the accompanying drawings.

In the drawings:

Figure 2 is a plan view looking downwardly toward the hopper bottom, and showing in particular the laterally spaced troughs through which the picker arm units move;

Figure 1:
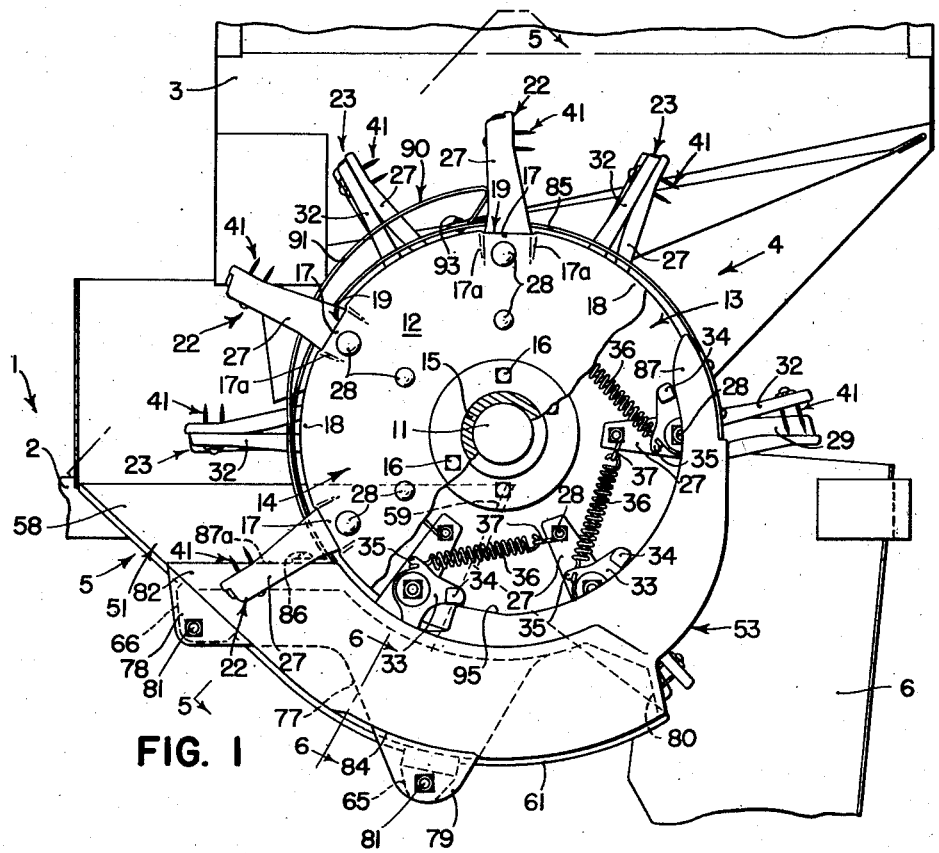
Figure 1 is a side view, with certain parts broken away, of a potato seed selecting mechanism constructed according to the principles of the present invention.
Figure 4:
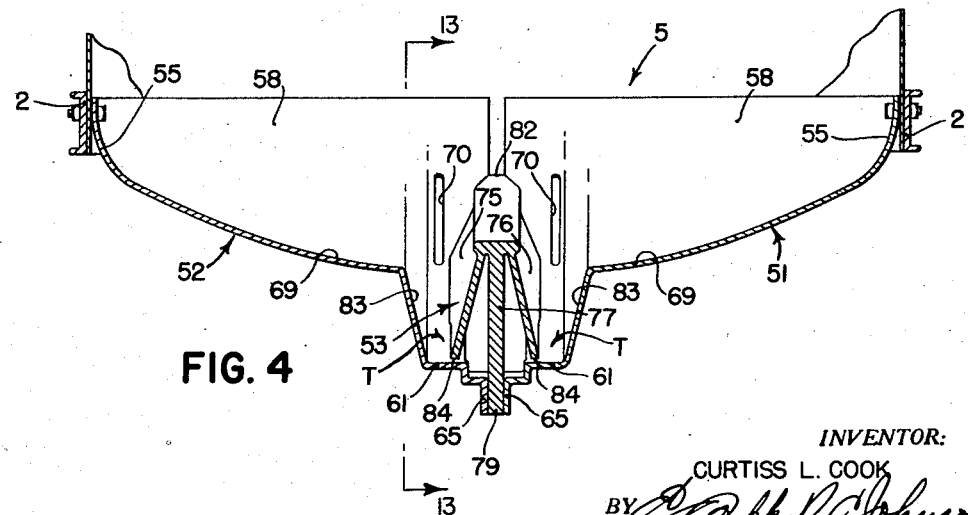
Figure 11:
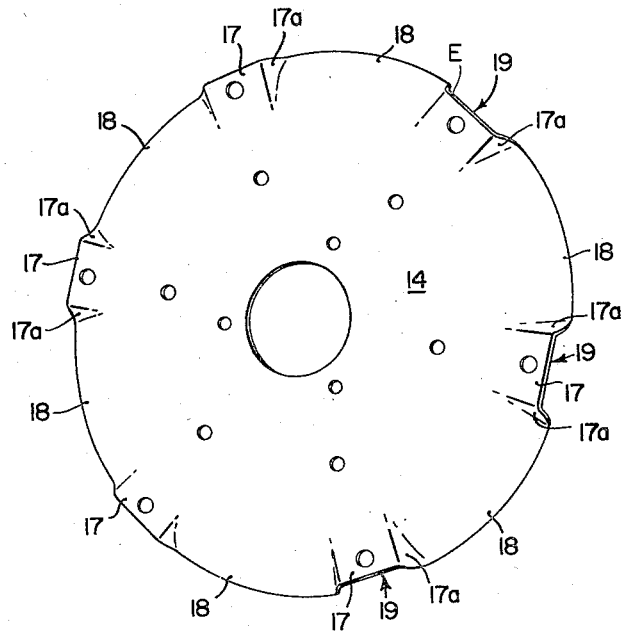
Figure 12:
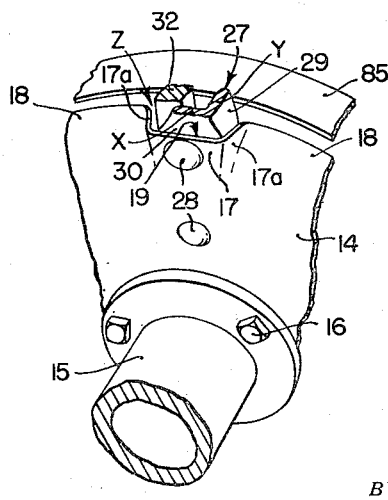
Figure 13:
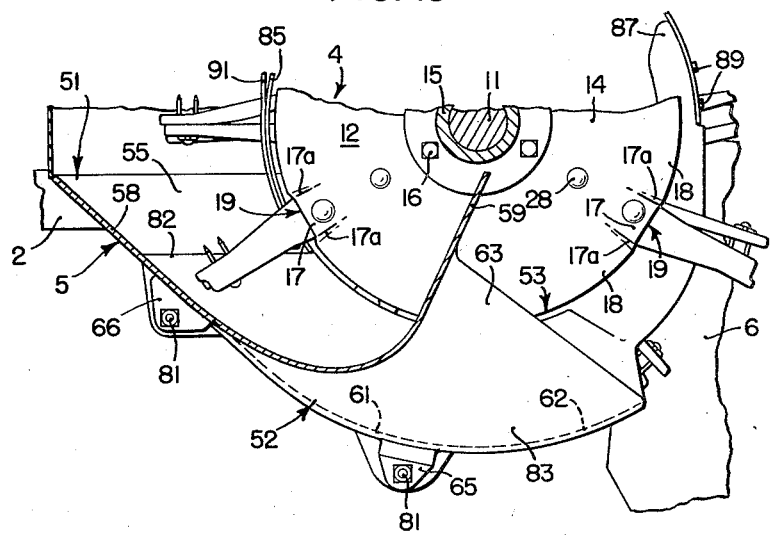
Figure 14:
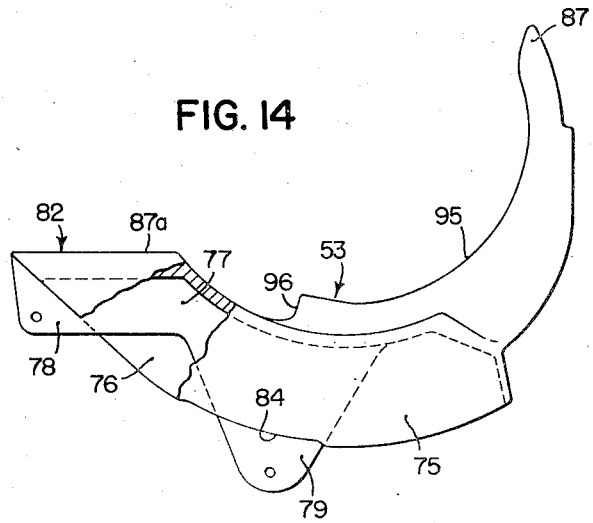

Figures 3 and 4 are fragmentary front and rear views of the hopper bottom, taken along the lines 3—3 and 4—4 of Figure 2, with the positions of the picker arms shown in dotted lines;

Figure 5 is a view taken along the line 5—5 of Figure 1, showing the two sets of picker arms;

Figure 6 is a fragmentary sectional view taken along the line 6—6 of Figure 1, showing how only radial adjustment of the picks is necessary to adapt the machine for seed pieces of different sizes;

Figure 7 is an enlarged sectional view taken along the line 7—7 of Figure 5;

Figure 8 is a fragmentary view showing the adjustment of the spacing strip between the picker units;

Figures 9 and 10 are enlarged portions of Figures 5 and 1, respectively;

Figure 11 is a perspective view of one of the picker heads;

Figure 12 is a fragmentary perspective of one set of picker arms;

Figure 13 is a sectional view taken generally along the line 13—13 of Figure 4; and Figure 14 is a side view of the central section of the hopper bottom.

The potato planter in which the principles of the present invention have been incorporated is indicated generally by the reference numeral 1 and includes a frame 2 carrying a seed container 3 and other operating parts of the machine, including the seed selecting or picker mechanism, with which the present invention is particularly concerned, indicated by the reference numeral 4. The frame 2 also supports a hopper bottom, indicated in its entirety by the reference numeral 5, In general, seed in the container 3 is delivered at a controlled rate into the hopper bottom 5, from which the seed selecting mechanism 4 selects and removes one seed at a time and discharges the same through a suitable seed conduit 6. The furrow openers and other parts of the potato planter are not shown since, so far as the present invention is concerned, they are largely conventional.

The seed selecting mechanism 4 comprises a rotatable shaft 11 which is driven in any suitable manner, such as by the ground wheels of the planter, as by forming the axle thereof. Suitable bearings (not shown) connect the shaft 11 with the frame 2 and accommodate rotation of the shaft in operation. Rotatable on the shaft 11 is a pair of heads 12, 13, each including a disk member 14 and a sleeve member 15 to which the disk is rigidly secured, as by bolts 16. The peripheral portion of each disk 14 is bent or dished laterally inwardly except at peripherally spaced points at which each disk is provided with pockets or arm-receiving recesses 19 formed by laterally outer planar wall sections 17 and end walls 17a joining the wall sections 17 with the inwardly dished portions 18. The peripheral edges E (Figure 5) of the recesses lie in the same cylindrical surface as the peripheral edges of the portions 18. As best shown in Figure 5, the pockets 19 are dimensioned so as to fit closely about the picker arm units to which detailed reference will be made below. The two sleeves 15 supporting the disks 14 are connected to rotate together by any suitable means and are controllably driven in any desired manner, as by a sprocket and chain connection with the ground wheel or wheels. The details of the drive and of the control therefor do not per se form any part of the present invention.

The picker arm units are arranged in sets and attached in generally radial relation to the two cooperating rotatable heads 12 and 13, the picker arm units attached to the rotatable head 12 being indicated by the reference numeral 22, and the picker arm units attached to the head 13 being indicated by the reference numeral 23. The picker arm units 22 and 23 are essentially identical, and hence a description of one will suffice. Each unit consists of a stationary arm 27 bolted, as at 28, at its inner end to the generally central part of the associated rotatable head and at its outer end to the associated planar wall section 17 of the recess or pocket 19 that receives it, as best shown in Figure 5. The periphery of the head is dished or curved laterally inwardly between the pockets 19 to form the inwardly dished portions 18 mentioned above. Each arm 27 includes a radially outwardly extending section 29 which, with a shielding flange 30, serves to form a portion which is angular in section where the arm is secured by the outer bolt 28 to the wall 17, thus including portions $x$ and $y$ (Figure 12) disposed at right angles to one another and fitting snugly against the wall 17 and adjacent wall 17a, as best shown in Figure 5.

The radially outer portion of each arm 27 is formed so as to flare laterally outwardly to a certain extent, as best shown in Figures 5 and 6. The arm 27 is provided with an elongated slot 31 extending in a generally radial direction for a considerable distance. The other arm section is indicated by the reference numeral 32 and is pivotally mounted for movement relative to the arm 27 about the radially outer bolt 28 as a pivot axis. The radially inward portion of the arm 32 has a lateral extension 33 on which a lug 34 is carried. A second lug 35 is also formed on the pivoted arm 32, and a spring 36 is connected between the lug 35 and a clip 37 fastened to the associated head by the radially inward attaching bolt 28 of the adjacent arm unit, as best shown in Figure 1. The spring 36 thus serves to bias the pivoted arm 32 for movement toward the fixed arm 27. Normally, the spring 36 moves the pivoted arm 32 up against the fixed arm 27 and alongside the flange 30. Each pivoted arm 32 lies closely adjacent to the wall 17a at the side of the pocket 19 opposite the arm portion $y$, as shown at $z$ in Figure 5, whereby each arm unit substantially fills the space defined by the walls 17 and 17a of the associated pocket 19 which receives the arm unit.

Each of the pivoted arms 32 carries a seed impaling pick member 41, which is preferably in the form of a U-shaped staple having sharpened ends 42. For this purpose each arm 32 is formed with a plurality of openings 43, 44 and 45 which are disposed in a radial plane passing through the elongated slot 31. The outer openings 43 and 45 are spaced equidistant from the center opening 44, and the spacing corresponds to the spacing between the pick ends 42 so that the staple 41 may be disposed in either of two positions, as indicated in dotted lines in Figure 7. A tapped opening 47 is formed in the arm 32 between the openings 43, 44 and 44, 45 so as to receive a screw 48 which, when threaded into the associated tapped opening, engages the central portion of the staple 41 and locks the same in position. Two tapped openings are provided to accommodate the two possible positions of the staple 41, both in the radial plane mentioned above. The length of the slot 31 accommodates the two positions of the staple, as just mentioned.

The hopper bottom 5 consists of three parts indicated generally by the reference numerals 51, 52, and 53. The two parts 51 and 52 are substantially identical except that one is right hand and the other left hand, and is shown generally in Figures 2–4. The hopper bottom section 51 is curved and shaped so that at one side a wall 55 is provided, the wall being apertured, as at 56, to receive bolts by which the section 51 may be connected to the planter frame. One end, as at 58, of the hopper bottom section 51 slopes upwardly and rearwardly while the other end is formed with a wall section that extends generally radially inwardly, as indicated by the reference numeral 59. The hopper bottom section 51 also has an arcuate connecting section 61 which, at 62, extends beyond the radial wall 59 and is connected thereto by a web section 63. A pair of lugs 65 and 66 formed along the marginal portion of the attaching section 61, and these lugs are apertured, as at 67. The bottom of the hopper section 51 slopes laterally upwardly, as at 69, from the arcuate attaching section 61 toward the laterally outer wall portion 55, which is disposed generally vertically when the hopper bottom wall section is in place. A dirt discharge opening 70 is formed as a slot extending along the marginal section 61, and this slot, as best shown in Figures 2 and 4, is disposed in the plane of the path of movement of the picker arm units and is normally quite close to the radially outer end portions thereof so as to facilitate the action of the arms in pushing dirt and the like out through the slot 70. The other hopper bottom wall section 52 is, as stated above, substantially identical with the one just described, except that it is made as a right hand unit while the unit 51 is left hand.

The central section of the hopper bottom wall is indicated in its entirety by the reference numeral 53 and comprises a member which, as best shown in Figures 3 and 4, is generally formed as an inverted V-shape in cross section, one generally conical wall portion being indicated by the reference numeral 75 and the corresponding conical wall section at the other side being indicated by the reference numeral 76. A central sector 77 is disposed in a plane which bisects the angle between the inclined sections 75 and 76 and is formed with a pair of apertured lugs 78 and 79 which register with the corresponding lugs 65 and 66 which are formed on the two right and left hand hopper bottom sections 51 and 52. Bolt means 81 serve to connect the apertured lugs and thereby rigidly fasten the several hopper bottom wall sections together so as to form the bottom of the hopper in which the rotatable arm units move. The radially outer marginal sections of the conical wall portions 75 and 76 are adapted to fit against the arcuate sections 61 of the two hopper bottom wall sections 51 and 52, and the wall portions 75 and 76 are brought together to form a point, as indicated by the reference numeral 82. As indicated by the reference numeral 83 (Figures 3 and 4), each of the hopper bottom wall sections 51 and 52 is shaped adjacent the lug 65 and the radial wall 59 so as to present a surface which cooperates with the adjacent conical wall of the central member 53, as at 75 or 76, to form a substantially V-shaped trough or groove through which the associated picker arms move. The walls 83 and 75 or 76 forming this V-shaped trough are disposed so that the plane bisecting the angle between the walls is substantially radial with respect to the rotatable picker arms and coincides with the plane of rotation thereof, particularly the plane that passes through the picker points 42 which is also the plane in which the points are radially adjustable, but not laterally adjustable. The advantage of this arrangement is that the points 42 may be adjusted readily to accommodate either large or small seed piecese. If the seed pieces are small, as shown at $a$ in Figure 6, they will normally lie closer to the apex of the V-shaped trough, each trough being indicated by the reference character T, whereas if the seed pieces are fairly large, as shown at $b$ in Figure 6, they will lie farther away from the apex of the trough T, but in both cases it will be noted that the center of the seed piece lies in the plane bisecting the V-shaped trough, in which plane the picker points 42 are adjustable and in which they move during operation. Therefore, a simple radial adjustment of the picker points 41 will accommodate the planter to the size of seed pieces which it is desired to plant. As shown in Figure 7, for large seed pieces, the picks 41 are disposed in the openings 43, 44, as shown in full lines, and for the smaller seed pieces the picks are disposed in the openings 44, 45, as shown in dotted lines. There are two tapped openings 47, as shown in Figure 7, to accommodate the two positions of the locking screw 48.

Since there are two sets of rotatable picker arm units, there are two troughs T, formed by the single central wall section 53 and the two cooperating members 51 and 52. The two sets of rotatable arm units are spaced apart a distance sufficient to accommodate the central section with its conical walls 75 and 76. The underside of the inverted V-shaped member is closed at its forward end by a transverse wall 80 (Figures 1 and 3).

A second set of dirt discharge slots is formed by recessed sections 84 (Figures 1, 4 and 6) in the central member 53 adjacent the lug 65. Passage of the picker arms tends to force dirt out of the hopper bottoms, not only through the slots 70 but also through the slots 84, as indicated by the arrow in Figure 6.

In order to close the axial space between the two rotatable picker arm heads 12 and 13, an arcuate strap 85 is placed about the upper portions of the rotatable heads. One end of the strap 85 is fastened, as by a screw 86, to the forward portion 87a of the tapered point portion 82 of the central hopper bottom wall member 53. Preferably, the other end of the strap 85 is provided with a pair of slots 88 disposed transversely and receives screws 89 that are screwed into tapped openings in the forward tip 87 at the front of the hopper bottom wall member 53. Thus, the lateral position of the forward end of the strap may be adjusted as desired, merely by loosening the screws 89 and shifting the strap.

In view of the fact that the strap 85 is of appreciable width, being disposed between the two sets of picker arms, it is possible that one of the arms might engage a seed piece, between the picks and the head, in such a way as to slide the same upwardly and along the strap 85 so that it might fall over into the seed chute 6. This would be undesirable since a seed piece would thus be deposited in the furrow at a point where a seed would be undesirable. In order to prevent this, I mount a cam member 90, preferably in the form of a narrow strap 91, on the strap 85. The strap 91 is fastened directly to the strap 85 at the forward edge, as by welding, riveting, or the like, adjacent the pointed portion 87a of the central member 53, and the strap 91 is bent outwardly and apertured to receive a screw 86 that fastens the straps 85 and 91 to the forward tip 87a of the central hopper bottom wall member 53. The strap 91 is shaped so that it is spaced away from the strap 85 at its upper end, the end of the strap 91 being bent around and backwardly, and fastened to the strap 85, as at 93. Thus, if a seed piece should be engaged by one of the arms and forced upwardly over the strap 85, the cam member 90 would serve to deflect the seed piece laterally and drop it back into the hopper before it would have an opportunity to be carried over and dropped through the chute 6.

As mentioned above, lugs 34 are formed on each of the pivoted picker arms 32, and as best shown in Figure 1, the central member 53 is formed with a central rib 95, preferably in the plane of the lugs 78 and 79, the rib 95 extending upwardly from a square shoulder 96 (Figure 2) at the rear to the tip 87 which is well above the plane of the axle shaft 11, the tip being the portion to which the forward end of the strap 85 is attached, as described above. The rib 95 is formed as a stationary cam for the purpose of rocking the pivoted arms 32 when they are above the chute 6 so as to strip the seed piece from the points 42, thereby releasing the seed piece and depositing it in the furrow. The cam 95 is thus shaped so that it starts to engage the extension 34 of each pivoted arm 32 at about the point a short distance before the arm is in a horizontal position, and the action of stripping the seed piece from the points 42 is completed at about the time the preceding arm starts to enter the associated trough T. Thus, when the seed piece is released there is no danger of it striking the preceding arm and being deflected. The cam 95 is also so shaped that during the rotation of the head the arms are separated still further until, when the extension 34 rides off the square end 96 of the cam 95, the spring 36 swings the pivoted arm 32 backwardly with considerable force, and as the pick points 42 pass through the slot 31 in the associated adjacent arm, they forcibly and positively impale a seed piece, which is then ready to be released by the time the arm again passes over into a position above the chute 6.

It will be observed that the two sets of picker arm units are staggered one with respect to the other, that is, each arm unit of one set is substantially midway between the two associated arm units of the other set. Thus, during operation, the seed pieces are released at a uniform rate, first from one rotatable head and then from the other, whereby a relatively high speed planter is provided, yet due to the division of the picker arm units into two separate sets, each with its own V-shaped trough through which the arm units pass, there is ample space between each arm unit and the next adjacent arm unit of that set so as to insure that a seed piece will be in front of the arm by the time the extension 34 of that arm rides off the end 96 of the cam 95. This insures that a seed piece will be impaled at the proper time so that there will will be no skips in the planting.

The provision of one or more V-shaped troughs or grooves, with the picks radially adjustable substantially in the bisecting plane of the trough, has the further advantage that whether the seed pieces be large or small, each is impaled by the pick in a central or bisecting plane in any adjustment of the picks 41. Normally, the aforesaid bisecting plane is vertical and since the associated walls, 75 (or 76) and 83, make equal angles with respect to the bisecting plane in which the picker points 41 are disposed and are adjustable, it is practically impossible to impale a potato seed piece other than in the central plane thereof. Thus, as the picker arm with its impaled seed passes up through the mass of seed in the bowl and emerges therefrom, there is little likelihood that contact with adjacent seed pieces will pull the impaled seed piece off its pick. On the other hand, if the seed piece was impaled at one side or the other, there would be an appreciable tendency for the other seed pieces in the seed hopper to dislodge the seed piece as the latter passes through the mass of seed pieces and emerges therefrom during the rotation of the picker head. Further, arrangements in which the picker arms move through troughs and adjacent a substantially vertical plane, the seed pieces in that case are always impaled at a fixed distance from one side of the seed, and therefore if the seed piece happens to be fairly large, the greater mass thereof overhangs the picker points with the result that the seed piece is easily, and frequently is, dislodged from the pick during the movement of the arm through the mass of seed in the bowl.

The spacing between the heads 12 and 13, which normally is closed by the strap 85, is designedly adequate to provide two important features of this invention. First, this space is adequate to eliminate any possibility of the seed pieces bridging across from one arm 22 to the adjacent arm 23 of the other set. It sometimes occurs in prior art planters that one or more seed pieces will bridge across and be carried over and dropped into the row, all in addition to the individual seed pieces that are selected by the arms. In a potato planter constructed according to the present invention, however, wherein there are only six arms in each set and the sets are spaced apart axially, the possibility of this occurrence is practically eliminated. Second, the axial spacing between the two sets of arms is adequate to provide convenient access to the picker arm mechanism, merely by loosening the strap 85 at one side, as by removing the set screw 86, and swinging the same to one side, the member 85 being flexible. By virtue of this spacing, the springs 36 may be removed and replaced, and also the arms 27 and 32 may be removed and replaced if necessary, all without requiring any dismantling of the axially spaced apart heads 12 and 13.

As best shown in Figure 1, the central dividing wall member 53 terminates in a tapered section 82 (Figure 2) which lies fairly well down in the lower portion of the bowl and just rearwardly of the zone where the seed pieces are impaled by the action of the abutments 34 riding off of the cam surface 95 (Figure 1). This has the important advantage of providing an open space at the rear of the picker arm heads by which it may be said that the two sets of arms are in communication with one another; that is, seed pieces delivered into the bowl from the hoppers can move freely to either one or the other set of picker arms as may be required. This is especially desirable in that it permits operation on side hills, because even though the feed is from only one of the hoppers, the seed pieces are free to keep both of the picker arm troughs T filled with seed.

While I have shown and described above the preferred structure in which the principles of the present invention have been incorporated, it is to be understood that my invention is not to be limited to the particular details shown in the drawings and described above, but that, in fact, widely different means may be employed in the practice of the broader aspects of my invention.

What I claim, therefore, and desire to secure by Letters Patent is:

1. In a potato planter, a picker arm construction comprising an arm having a pair of spaced openings therein, a U-shaped picker staple having a pair of sharpened ends and adapted to be disposed in said openings, and means for holding said staple in said arm comprising a screw threaded into said arm between said holes so as to engage the intermediate portion of the staple for holding both points of the latter in position.

2. In a potato planter, a hopper, a pair of axially aligned spaced apart rotatable heads in said hopper, a plurality of picker arm units carried by each of said rotatable heads, a dividing member forming a part of the hopper bottom and disposed between said sets of picker arm units, said dividing member serving to close the space between the lower portions of said rotatable heads, and means carried by said dividing member and extending over the upper portions of said rotatable heads for closing the space between the latter.

3. In a potato planter, a hopper, a pair of axially spaced rotatable heads disposed in said hopper, each rotatable head including a plurality of picker arm units, a member at least partially encircling said heads and serving to close the space therebetween, and cam means on said member for causing seed carried upwardly by said arm units to be discharged back into the hopper.

4. In a potato planter, a pair of axially aligned spaced apart rotatable heads, each having a plurality of picker arm units carried thereby, and extending radially outwardly therefrom, a member disposed between said picker arm units and extending generally about the peripheral portions of said rotatable heads for closing the space between the latter, and a narrow strap connected with said spacing member and shaped as a cam for moving laterally away from said spacing member any potato seed that may be carried along said spacing member by said arm units.

5. In a potato planter, a pair of rotatable heads, each having a set of seed selecting means, means serving as a radially outwardly extending cam member between said sets of seed selecting means and having a non-circular section extending in the direction of rotation of said heads from a point where the seed selecting means engage the seed to the point where the latter are discharged for preventing seed pieces from bridging across the space between said seed selecting means, and means disposed between said rotatable heads for supporting said cam member in a position between said seed selecting means.

6. In a potato planter, a hopper bottom construction comprising a central member having flaring side walls and central apertured lugs, a pair of hopper bottom members having extended apertured lugs extending underneath said central member so as to engage the lugs on said central member and laterally inner marginal sections engaging the edge portions of the flaring wall sections of said central member, and means securing the lugs of said hopper bottom members to the lugs of said central member for fixing all of said members rigidly together to complete the hopper bottom.

7. In a potato planter, a pair of rotatable heads, each having a set of seed selecting means, and means serving as a wall between said sets of seed selecting means, said wall being formed so that, in the direction of rotation of said heads, portions thereof lie at progressively increasing distances from the axis of said rotatable heads, thereby serving to prevent seed pieces from bridging across the space between said seed selecting means.

8. In a potato planter, a pair of axially spaced apart rotatable members having seed selecting arms extending generally radially, the arms on each member forming a set of seed selecting elements and said sets being spaced apart laterally, a central hopper bottom member having a portion disposed as a divider between the two sets of radial seed selecting elements and formed with portions extending radially alongside and having edges extending radially outwardly beyond said seed selecting elements, and a pair of hopper bottom members having their adjacent edge portions disposed substantially underneath and against the edges of said central hopper bottom member to complete the hopper bottom and to form with said central member a pair of grooves through which the seed selecting radial elements normally move.

9. In a potato planter, a rotatable head comprising a member having a generally radially directed portion and a peripheral portion formed with a series of pockets spaced apart by laterally inwardly directed sections, each of said pockets comprising a laterally outer wall disposed in the plane of said radially directed portion and generally triangular end walls joining said laterally outer wall to said laterally inwardly directed sections, a picker unit disposed in each of said pockets and including sections disposed closely adjacent said pocket end walls, and means fixing each picker unit to the radially outer portions of the laterally outer wall of the associated pocket.

10. In a potato planter, a rotatable head comprising a pair of members each having a generally radially directed portion and a peripheral portion formed with a series of pockets spaced apart by laterally inwardly directed sections, each of said pockets comprising a laterally outer wall disposed in the plane of said radially directed portion and generally triangular end walls joining said laterally outer wall to said laterally inwardly directed sections, a central stationary member disposed between said rotatable head members, and a band carried by said stationary member and substantially closing the space between the laterally inwardly directed sections on one of the rotatable members and the laterally inwardly directed sections on the other rotatable member.

11. In a potato planter, a rotatable head comprising a pair of members each having a generally radially directed portion and a peripheral portion formed with a series of pockets spaced apart by laterally inwardly directed sections, each of said pockets comprising a laterally outer wall disposed in the plane of said radially directed portion and generally triangular end walls joining said laterally outer wall to said laterally inwardly directed sections, and a picker unit disposed in each pocket, each unit including an arm angular in cross section and having one leg fitting against and secured to the laterally outer wall of the associated pocket and the other leg being disposed against one of the triangular end walls of said pocket.

12. In a potato planter, a rotatable head comprising a pair of members each having a generally radially directed portion and a peripheral portion formed with a series of pockets spaced apart by laterally inwardly directed sections, each of said pockets comprising a laterally outer wall disposed in the plane of said radially directed portion and generally triangular end walls joining said laterally outer wall to said laterally inwardly directed sections, and a picker unit disposed in each pocket, each unit including an arm angular in cross section and having one leg fitting against and secured to the laterally outer wall of the associated pocket and the other leg being disposed against one of the triangular end walls of said pocket, and a second arm pivoted relative to said first arm and disposed in close fitting relation with respect to the other triangular end wall of the associated pocket.

13. In a potato planter, a member mounted for rotation about an axis and including a dished peripheral portion, arm-receiving pockets formed in the dished peripheral portion of said member, each of said pockets including a planar wall section disposed in the general plane of said member extending generally radially outwardly to substantially the same extent as the periphery of said member, a picker arm unit disposed in each of said pockets, and means fastening each picker arm to the associated planar wall portion thereof adjacent the radially outer portion thereof.

14. In a potato planter, a hopper including a portion substantially V-shaped in cross section, a picker arm movable in said hopper about an axis of rotation, the walls of said V-shaped hopper portion making substantially equal angles with respect to a plane normal to said axis, said plane bisecting said V-shaped hopper portion, said arm movable in said hopper through said V-shaped portion and having a plurality of more than two radially spaced uniformly spaced apart openings all lying in the same plane and said latter plane coinciding with said radial bisecting plane, each opening being spaced substantially midway between said walls whereby, whether the potato seed piece lying in said V-shaped hopper portion be large or small, its center lies substantially in said radial plane containing said plurality of arm openings, and a U-shaped impaling pin having a pair of points spaced apart the same distance as the distance between said uniformly spaced apart openings in said picker arm, said impaling pin being insertable in any pair of adjacent openings of said plurality of openings and, in any position in said arm, said impaling pin lying in said radial bisecting plane.

15. In a potato planter, a rotatable head including a picker arm having a pin-receiving part disposed in a radial plane generally perpendicular to the axis of rotation of said rotatable head, a hopper including a portion substantially V-shaped in cross section, the walls of said V-shaped portion being disposed in generally downwardly converging relation so as to intersect one another in said perpendicular radial plane, said walls making equal angles with said perpendicular radial plane, a plurality of at least three openings in said pin-receiving part, said openings lying parallel and in the same plane and said latter plane coinciding with said perpendicular radial plane whereby each of said openings lies in said perpendicular plane, said openings being disposed at different radial distances from the axis of rotation of said rotatable head, and impaling pin means insertable optionally in different openings of said plurality of openings, depending upon the size of seed it is desired to plant, said impaling pin means including a pair of pin sections, said pair of pin sections being disposed in a pair of openings farther away from the apex of the associated V-shaped hopper portion so that both pin sections are disposed in a position to engage the larger seed pieces, said pair of pin sections being insertable in a pair of openings closer to said apex so that both pin sections are disposed in a position to engage the smaller seed pieces, whereby said impaling pin means will engage each seed piece, whether large or small, at a pair of vertically spaced points lying substantially in the plane of the center of each seed piece.

16. In a potato planter, a rotatable head comprising a pair of members each having a generally radially directed portion and a peripheral portion formed with a series of pockets spaced apart by laterally inwardly directed sections, a central stationary member disposed between said rotatable head members, and a band carried by said stationary member and substantially closing the space between the laterally inwardly directed sections on one of the rotatable members and the laterally inwardly directed sections on the other rotatable member.

17. In a potato planter, a picker arm construction comprising an arm having a pair of spaced holes therein, a U-shaped picker staple having a pair of sharpened ends and adapted to be disposed in said openings, and means for holding said staple in said arm comprising a part releasably connected with said arm between said holes so as to engage the intermediate portion of the staple for holding both points of the latter in position.

18. In a potato planter, a picker arm construction comprising an arm having a plurality of more than two generally parallel holes spaced apart generally in alignment longitudinally of said arm, a U-shaped picker staple having a pair of sharpened ends and adapted to be disposed in any adjacent pair of said openings, and means for holding said staple in said arm comprising a part-receiving means on said arm between adjacent openings and a staple-holding part connectible with any of said part-receiving means on said arm for engaging the intermediate portion of the staple when inserted in the associated pair of openings so as to hold both points of said staple in the position selected therefor in said arm.

CURTISS L. COOK.

REFERENCES CITED

The following references are of record in the file of this patent:

UNITED STATES PATENTS

| Number | Name | Date |
|---|---|---|
| 545,837 | Baker | Sept. 3, 1895 |
| 1,287,601 | McWhorter | Dec. 10, 1918 |
| 1,314,398 | Hendrickson | Aug. 26, 1919 |
| 1,410,843 | Sperry | Mar. 28, 1922 |
| 1,562,681 | Bonaly | Nov. 24, 1925 |
| 1,890,629 | Symington | Dec. 13, 1932 |
| 2,031,547 | Reuther | Feb. 18, 1936 |
| 2,073,037 | Weber | Mar. 9, 1937 |
| 2,137,713 | Conner | Nov. 22, 1938 |
| 2,345,053 | Judd et al. | Mar. 28, 1944 |